US006430019B1

(12) United States Patent
Martenson et al.

(10) Patent No.: US 6,430,019 B1
(45) Date of Patent: Aug. 6, 2002

(54) CIRCUIT PROTECTION DEVICE

(75) Inventors: Kenneth R. Martenson, Newbury; Jerry L. Mosesian, Newburyport, both of MA (US)

(73) Assignee: Ferraz S.A. (FR)

(*) Notice: Subject to any disclaimer, the term of this patent is extended or adjusted under 35 U.S.C. 154(b) by 0 days.

(21) Appl. No.: 09/376,035

(22) Filed: Aug. 17, 1999

Related U.S. Application Data

(63) Continuation-in-part of application No. 09/093,367, filed on Jun. 8, 1998, now Pat. No. 6,040,971.

(51) Int. Cl.⁷ .................................................. H02H 1/00
(52) U.S. Cl. ........................ 361/124; 361/103; 361/127
(58) Field of Search ................................ 361/2, 40, 56, 361/102–103, 111, 124, 126–127, 117–118, 3–7, 134–135; 337/273, 278, 110, 282; 218/89, 117

(56) References Cited

U.S. PATENT DOCUMENTS

| | | | |
|---|---|---|---|
| 4,288,833 A | 9/1981 | Howell | 361/124 |
| 4,493,005 A | 1/1985 | Lange | 361/124 |
| 4,538,201 A | 8/1985 | Wuyts et al. | 361/124 |
| 4,562,323 A * | 12/1985 | Belbel et al. | 218/117 |
| 4,720,759 A | 1/1988 | Tabei | 361/105 |
| 4,733,324 A * | 3/1988 | George | 361/118 |
| 4,739,436 A * | 4/1988 | Stefani et al. | 361/56 |
| 4,801,772 A * | 1/1989 | Bratkowski et al. | 200/151 |
| 4,809,124 A * | 2/1989 | Kresge | 361/58 |
| 4,887,183 A | 12/1989 | Biederstedt et al. | 361/124 |
| 4,901,183 A | 2/1990 | Lee | 361/56 |
| 5,043,527 A | 8/1991 | Carpenter, Jr. | 174/2 |
| 5,073,678 A | 12/1991 | Carpenter, Jr. | 174/2 |
| 5,101,180 A | 3/1992 | Frey | 333/12 |
| 5,311,393 A | 5/1994 | Bird | 361/104 |
| 5,359,657 A * | 10/1994 | Pelegris | 379/412 |
| 5,379,176 A | 1/1995 | Bacon et al. | 361/106 |
| 5,379,177 A | 1/1995 | Bird | 361/118 |
| 5,392,188 A | 2/1995 | Epstein | 361/118 |
| 5,404,126 A | 4/1995 | Kasai et al. | 338/21 |
| 5,495,383 A | 2/1996 | Yoshioka et al. | 361/56 |
| 5,519,564 A | 5/1996 | Carpenter, Jr. | 361/127 |
| 5,532,897 A | 7/1996 | Carpenter, Jr. | 361/118 |
| 5,574,614 A | 11/1996 | Busse et al. | 361/119 |
| 5,644,283 A | 7/1997 | Grosse-Wilde et al. | 338/20 |
| 5,675,468 A | 10/1997 | Chang | 361/119 |
| 5,699,818 A | 12/1997 | Carpenter, Jr. | 135/16 |
| 5,808,850 A | 9/1998 | Carpenter, Jr. | 361/127 |
| 5,901,027 A * | 5/1999 | Ziegler et al. | 361/124 |
| 6,040,971 A * | 3/2000 | Martenson et al. | 361/118 |
| 6,211,770 B1 * | 4/2001 | Coyle | 361/117 |

OTHER PUBLICATIONS

Harris Semiconductor, "Transient Voltage Suppression Devices" Transient V–I Characteristics Curves, p. 4–57, (Jun. 8, 1995).

* cited by examiner

*Primary Examiner*—Ronald W. Leja
(74) *Attorney, Agent, or Firm*—Mark Kusner; Michael A. Jaffe

(57) ABSTRACT

A voltage suppression device for suppressing voltage surges in an electrical circuit, comprised of a voltage sensitive element having a predetermined voltage rating, the voltage sensitive element increasing in temperature as voltage applied across the voltage sensitive element exceeds the voltage rating. Terminals are provided for electrically connecting the voltage sensitive element between a power line of an electrical circuit and a ground or neutral line of the electrical circuit. A normally closed, thermal switch is electrically connected in series with the voltage sensitive element between the power line and the voltage sensitive element, the thermal switch being thermally coupled to the voltage sensitive element wherein the thermal switch moves from a normally closed position to an open position to form a gap between the thermal switch and the voltage sensitive element when the temperature of the voltage sensitive element reaches a level indicating an over-voltage condition. A non-conductive barrier that is operable to move into the gap when the thermal switch moves to an open position, the barrier preventing line voltage surges from arcing between the thermal switch and the voltage sensitive element.

30 Claims, 13 Drawing Sheets

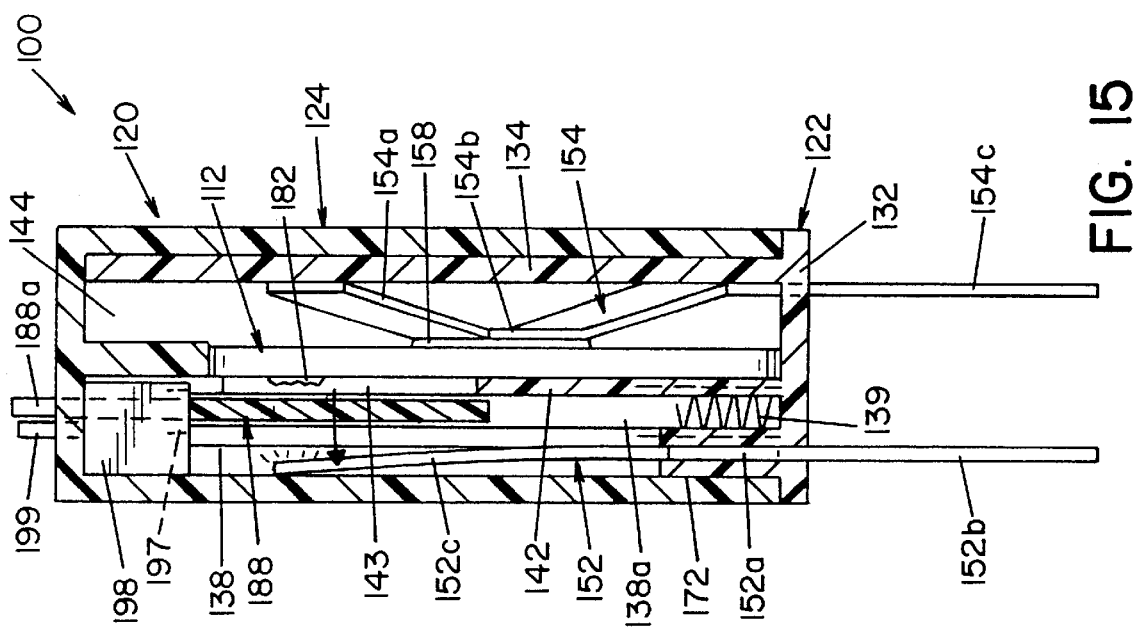
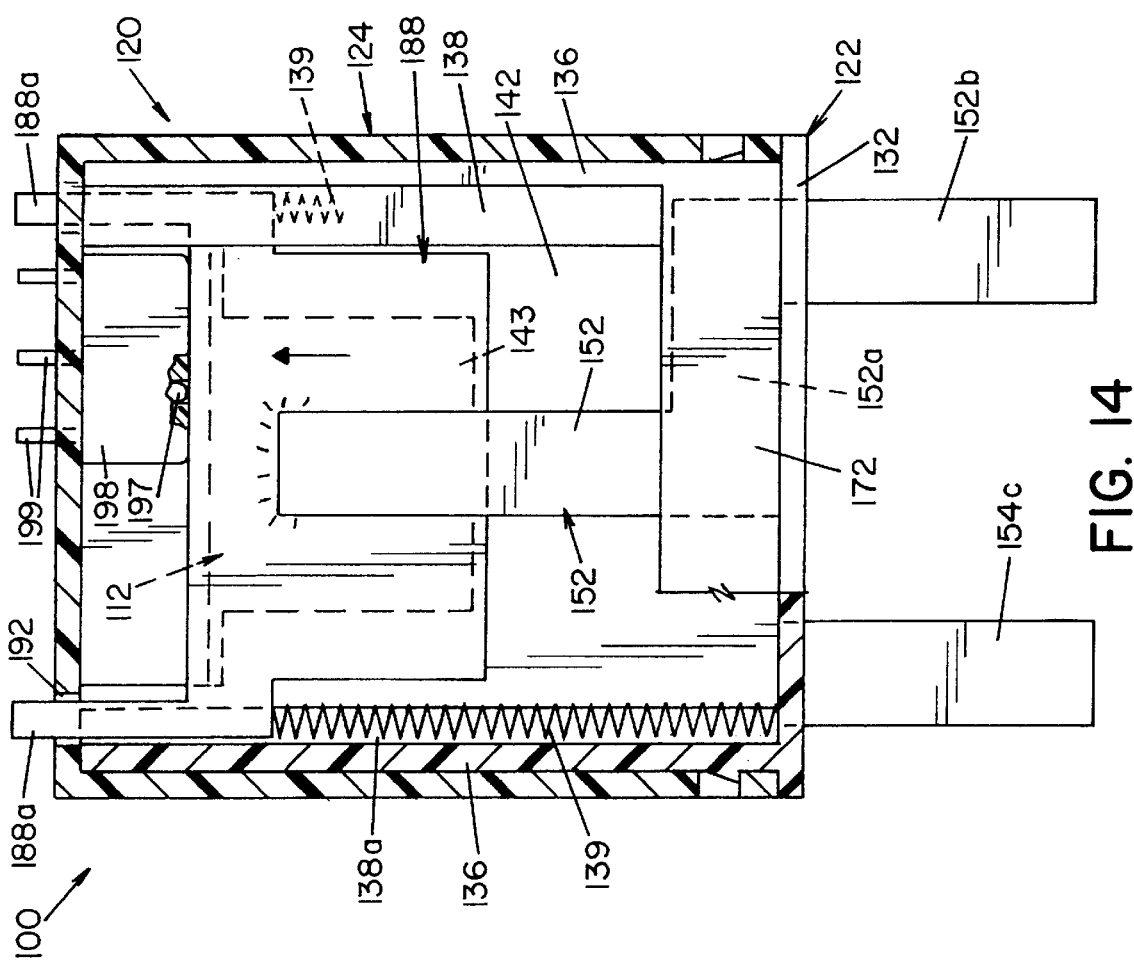

CIRCUIT PROTECTION DEVICE

This application is a continuation-in-part of application Ser. No. 09/093,367, filed on Jun. 8, 1998, now U.S. Pat. No. 6,040,971.

FIELD OF THE INVENTION

The present invention relates generally to circuit protection devices, and more particularly to a device that suppresses transient current/voltage surges.

BACKGROUND OF THE INVENTION

Many of today's highly sensitive electronic components, such as computer and computer-related equipment, that are used in commercial and residential applications contain transient voltage surge suppression (TVSS) devices. These devices protect sensitive and/or expensive electronic circuits and components from damage from over-voltage fault conditions. Such transient voltage surge suppression systems are typically designed for moderate fault conditions expected in normal use. In this respect, such systems are designed to suppress relatively minor fault conditions, but are not designed to protect against major over-voltage conditions. Examples of major over-voltage conditions include those that may occur from losing the system neutral or ground termination, or from repetitive current pulses as from lightning strikes. Such major over-voltage conditions can have catastrophic effects on sensitive electronic circuits and components. To prevent such fault conditions from reaching and damaging electronic circuits, components and equipment, it has been known to utilize larger voltage surge suppression devices. These devices are typically deployed at a building's incoming electrical service power lines, or within a building's power distribution grid to control power surges in the electrical lines to the building, or in the electrical lines to specific floors of the building. Such voltage surge suppression devices typically include a plurality of metal-oxide varistors (MOVs) connected in parallel between a service power line and a ground or neutral line, or between a neutral line and a ground line.

MOVs are non-linear, electronic devices made of ceramic-like materials comprising zinc-oxide grains and a complex amorphous inner granular material. Over a wide range of current, the voltage remains within a narrow band commonly called the varistor voltage. A log-log plot of the instantaneous voltage in volts versus the instantaneous current in amps yields a nearly horizontal line. It is this unique current-voltage characteristic that makes MOVs ideal devices for protection of sensitive electronic circuits against electrical surges, over-voltages, faults or shorts.

When exposed to voltages exceeding their voltage value, MOVs become highly conductive devices that absorb and dissipate the energy related to the overvoltage and simultaneously limit dump current to a neutral line or ground plane. If an over-voltage condition is not discontinued, the MOVs will continue to overheat and can ultimately fail catastrophically, i.e., rupture or explode. Such catastrophic failure may destroy the sensitive electronic equipment and components in the vicinity of the MOVs. The destruction of electrical equipment or components in the electrical distribution system can disrupt power to buildings or floors for prolonged periods of time until such components are replaced or repaired. Moreover, the failure of the MOVs in a surge suppression system may allow the fault condition to reach the sensitive electronic equipment the system was designed to protect.

In U.S. Pat. No. 6,040,971 to Martenson et al., entitled CIRCUIT PROTECTION DEVICE, there is disclosed a voltage suppression device for protecting an array of metal oxide varistors in a surge suppression system. The device was operable to drop offline an entire array of MOVs in the event that a voltage surge reached a level wherein one or more of the MOVs in the array might catastrophically fail. In the disclosed device and system, a trigger MOV was designed to have a lower voltage rating than any of the MOVs in the array. Thus, the entire array would drop offline in the event that a surge condition exceeded the voltage rating of the trigger MOV. In some instances, however, it may be desirable to maintain the array of MOVs active and to drop offline only those MOVs sensing a voltage surge exceeding the voltage rating of that particular MOV.

The present invention provides a circuit protection device, and a transient voltage surge suppression system incorporating such device, to protect an electrical system from catastrophic failure due to excessive over-voltage conditions or repetitive fault conditions.

SUMMARY OF THE INVENTION

In accordance with the present invention, there is provided a voltage suppression device for suppressing voltage surges in an electrical circuit. The device is comprised of a voltage sensitive element having a first surface and a second surface and a predetermined voltage rating across the first and second surfaces. The voltage sensitive element increases in temperature as the voltage applied across the first and second surfaces exceeds the voltage rating. A first terminal has one end electrically connected to the first surface of the voltage sensitive element and the other end of the terminal is connected to a ground or neutral line of an electrical circuit. A thermal element is electrically connected to the second surface of the voltage sensitive element, the thermal element being an electrically conductive solid at room temperature and having a predetermined softening temperature. A second terminal has one end in electrical connection with the second surface of the thermal element and another end connected to an electrical power line of an electrical circuit. The voltage sensitive element senses the voltage drop between the electrical power line and ground or neutral line. The second terminal is maintained in contact with the thermal element by the thermal element and is biased away therefrom. The second terminal moves away from electrical contact with the thermal element and breaks the electrical current path if an over-voltage condition sensed by the voltage sensitive element exceeds the voltage rating of the voltage sensitive element. Such an over-voltage causes the voltage sensitive element to heat the thermal element beyond its softening point. An arc shield moves from a first position wherein the arc shield allows contact between the second terminal and the thermal element to a second position wherein the shield is disposed between the second contact and the thermal element, i.e., when the second terminal moves from electrical contact with the thermal element.

In accordance with another aspect of the present invention, there is provided a voltage suppression device for suppressing voltage surges in an electrical circuit. The device is comprised of a voltage sensitive element having a predetermined voltage rating. The voltage sensitive element increases in temperature as voltage applied across the voltage sensitive element exceeds the voltage rating. Terminals electrically connect the voltage sensitive element between a power line of an electrical circuit and a ground or neutral line of the electrical circuit. A normally closed, thermal switch is electrically connected in series with the voltage sensitive element between the power line and the voltage sensitive element. The thermal switch is thermally coupled to the voltage sensitive element wherein the thermal switch moves from a normally closed position to an open position to form a gap between the thermal switch and the voltage sensitive element when the temperature of the voltage sensitive element reaches a level indicating an over-voltage condition. A non-conductive barrier is operable to move into the gap when the thermal switch moves to an open position. The barrier prevents line voltage surges from arcing between the thermal switch and the voltage sensitive element.

It is an object of the present invention to provide a circuit protection device to protect sensitive circuit components and systems from current and voltage surges.

It is another object of the present invention to provide a circuit protection device as described above to prevent catastrophic failure of a transient voltage surge suppression (TVSS) system within a circuit that may occur from repetitive circuit faults or from a single fault of excessive proportion.

A further object of the present invention is to provide a circuit protection device as described above that includes a current suppression device and a voltage suppression device.

Another object of the present invention is to provide a circuit protection device as described above for protecting a transient voltage surge suppression system having metal-oxide varistors (MOVs).

A still further object of the present invention is to provide a circuit protection device as described above that includes a metal-oxide varistor as a circuit-breaking device.

A still further object of the present invention is to provide a circuit protection device as described above that is modular in design and easily replaceable in a circuit.

These and other objects and advantages will become apparent from the following description of a preferred embodiment of the present invention taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 14 is a partially sectioned, front view of the circuit protection device shown in FIG. 10, showing the device after it has been "triggered" by a fault condition;

FIG. 15 is a partially sectioned, side view of the circuit protection device shown in FIG. 14;

DETAILED DESCRIPTION OF PREFERRED EMBODIMENT

Figure 1:
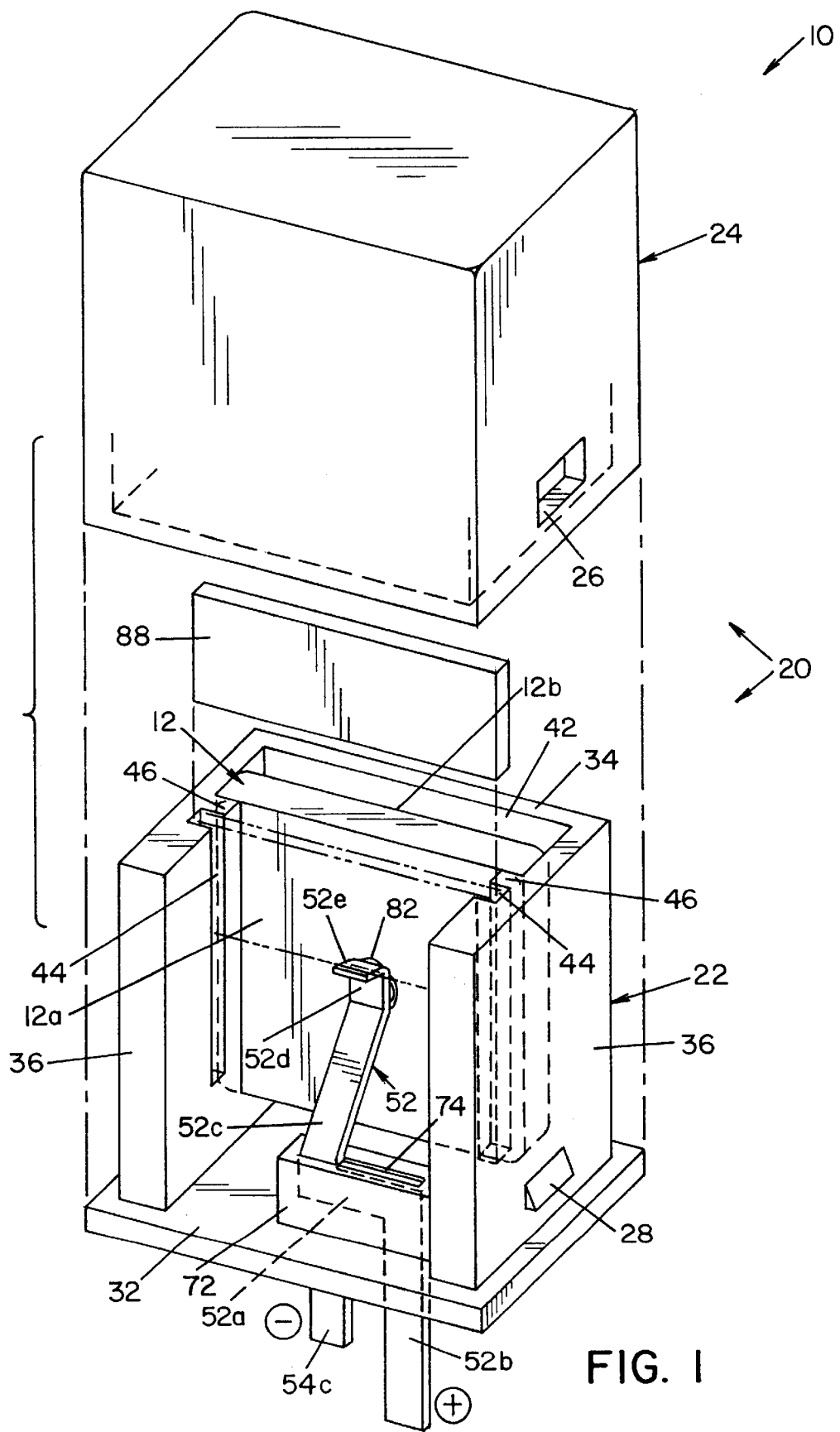
FIG. 1 is an exploded, pictorial view of a circuit protection device illustrating a preferred embodiment of the present invention.

Referring now to the drawings wherein the showings are for the purpose of illustrating a preferred embodiment of the invention only, and not for the purpose of limiting same, FIG. 1 is an exploded perspective view of a transient voltage suppression device 10 for use with a power distribution system for preventing voltage fault conditions from reaching a sensitive circuit load.

Voltage suppression device 10 is generally comprised of a voltage sensitive element 12 that is contained within a housing 20. Housing 20 is comprised of a base section 22 and a cover section 24. Base section 22 is adapted to receive and hold the operative elements of a voltage suppression device 10. To this end, base section 22 includes a generally planar bottom wall portion 32. A generally U-shaped structure, comprised of a back wall 34 and opposed side walls 36, extends from bottom wall 32. Side walls 36 are formed to define a cavity 42 adjacent to back wall 34. Cavity 42 is dimensioned to receive voltage sensitive element 12. In the embodiment shown, voltage sensitive element 12 is rectangular in shape, and therefore, cavity 42 is rectangular in shape. As will be appreciated by those skilled in the art, voltage sensitive element 12 may be cylindrical in shape, and thus the bottom portion of cavity 42 may be semi-cylindrical in shape to receive a cylindrical element.

Referring now to voltage sensitive element 12, in accordance with the present invention, such element is voltage sensitive and operable to heat up when a voltage applied across the device exceeds a preselected voltage. In accordance with the present invention, voltage sensitive element 12 is preferably comprised of a metal-oxide varistor.

By way of background, MOVs are primarily comprised of zinc oxide granules that are sintered together to form a disc. Zinc oxide, as a solid, is a highly conductive material. However, minute air gaps or grain boundaries exist between the sintered zinc oxide granules in a MOV, and these air gaps and grain boundaries inhibit current flow at low voltages. At higher voltages, the gaps and boundaries between the zinc oxide granules are not wide enough to block current flow, and thus the MOV becomes a highly conductive component.

This conduction, however, generates significant heat energy in the MOV. MOVs are typically classified and identified by a "nominal voltage." The nominal voltage of an MOV, typically identified by $V_{N(DC)}$, is the voltage at which the device changes from an "off state" (i.e., the state where the MOV is generally non-conductive) and enters its conductive mode of operation.

Importantly, this voltage is characterized at the 1 mA point and has specified minimum and maximum voltage levels, referred to hereinafter as $V^{MIN}$ and $V_{MAX}$ respectively. By way of example, and not limitation, a metal-oxide varistor (MOV) having a nominal varistor voltage, $V_{N(DC)}$, of 200 volts may actually exhibit a change from its generally non-conductive to its conductive state at a voltage between a minimum voltage, $V_{MIN}$, of 184 volts and a maximum voltage, $V_{MAX}$, of 228 volts. This range of operating voltages for a MOV of a rated nominal voltage $V_{N(DC)}$ is the result of the nature of the device. In this respect, the actual voltage value of a MOV basically depends on the thickness of the MOV and on the number and size of the zinc oxide granules disposed between the two electrode surfaces. At the present time, it is simply impossible, because of the construction and composition of metal-oxide varistors, to produce identical devices having identical operating characteristics.

Thus, although MOV 12 of over-voltage protection device 10 preferably has a rated "nominal voltage" $V_{N(DC)}$ at 1 mA, the actual voltage at which MOV 12 and every other MOV changes from a non-conducting state to a conducting state may vary between a $V_{MIN}$ and a $V_{MAX}$ for the rated nominal voltage value. In the context of the present invention, the minimum voltage $V_{MIN}$ of the selected MOV 12 is important, as will be discussed in greater detail below.

Referring again to base section 22 of housing 20, as best seen in FIGS. 1–4, cavity 42 is dimensioned to be significantly deeper (i.e. thicker) than the thickness of MOV 12, for reasons that shall be described in greater detail below.

Each sidewall 36 includes a slot 44 that is spaced from cavity 42 to define a wall or rail 46 of predetermined thickness. Slots 44 in opposed side walls 36 are aligned with each other and extend a predetermined length from the free, upper ends of side wall 36 toward bottom wall 32.

Figure 2:
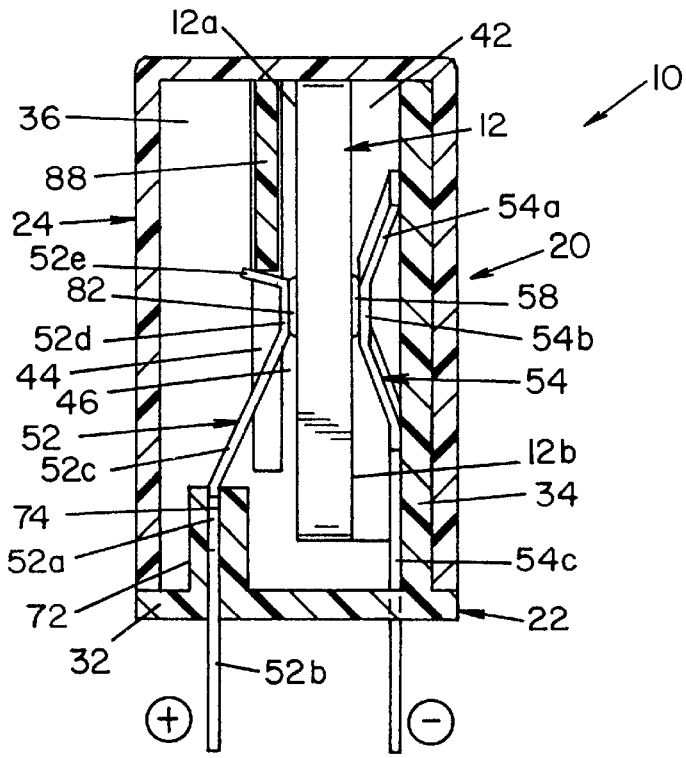
FIG. 2 is a cross-sectional, side view of the circuit protection device shown in FIG. 1 showing the device in a normal operating configuration.
Figure 3:
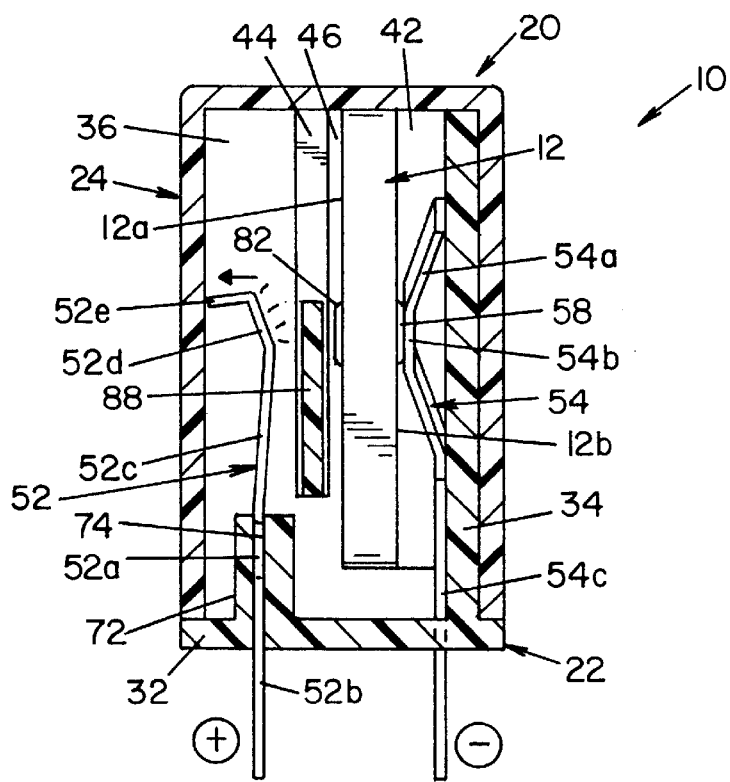
FIG. 3 is a cross-sectional, side view of the circuit protection device shown in FIG. 1 showing the device after actuation by a fault condition.
Figure 4:
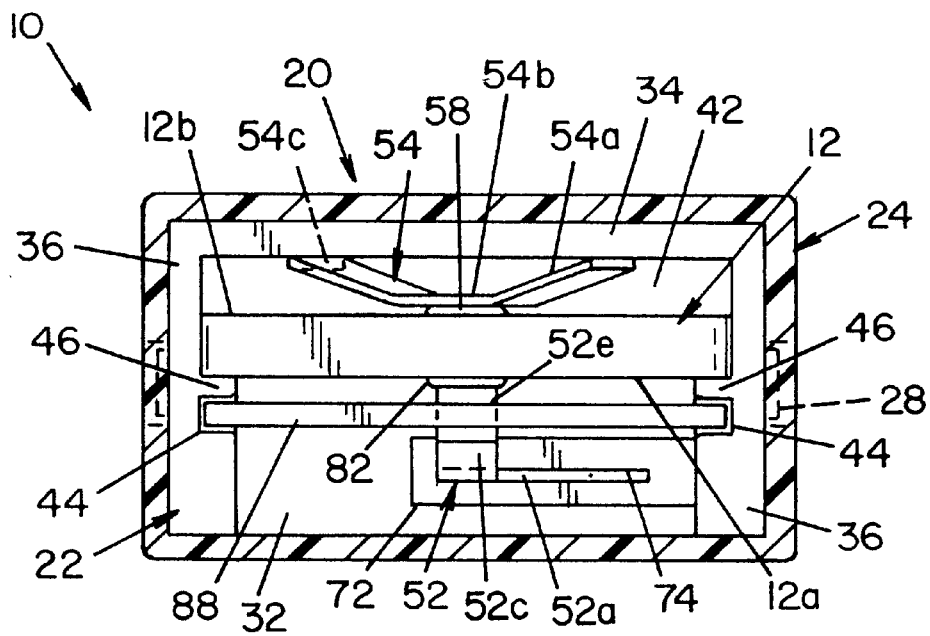
FIG. 4 is a partially sectioned, top-plan of the circuit protection device shown in FIG. 1.

A pair of contact elements 52, 54 are provided for electrical attachment to the opposite sides of MOV 12. Referring now to FIGS. 2–4 and 6, contact element 54 includes a generally V-shaped body, designated 54a, having a generally flat mid-section 54b and a flat elongated leg portion 54c extending from one end thereof. Contact element 54 is dimensioned such that mid-section 54b is attached to surface 12b of MOV 12 by an electrically conductive material, designated 58 in the drawings. Conductive material 58 is preferably formed of a high temperature, metallic solder such as silver, lead or alloys thereof. With mid-section 54b attached to surface 12b of MOV 12, leg portion 54c is dimensioned to extend through an opening in bottom wall 32 of base section 22 and to project therefrom. The projecting portion of leg portion 54c is provided as a negative lead for attachment to a ground or neutral line on an electrical circuit, as shall be described hereinafter. In accordance with one aspect of the present invention, contact element 54 is formed of a spring metal. As best seen in FIGS. 2 and 3, contact element 54 is disposed between MOV 12 and back wall 34 of base section 22. V-shaped body portion 54a of contact element 54 is dimensioned to force MOV 12 away from back wall 34 when MOV 12 is inserted into cavity 42. In other words, in addition to being an electrically conductive component, contact element 54 acts as a spring to force MOV 12 away from back wall 34 into contact with rail 46. As indicated above and best seen in FIGS. 2 and 3, cavity 42 is significantly wider than the thickness of MOV 12.

In accordance with one aspect of the present invention, cavity 42 and contact element 54 allow housing 20 to receive MOVs of different thicknesses. In this respect, many MOVs are formed to have the same overall shape, but vary only in thickness. The thickness of the MOV determines the rated "nominal voltage" $V_{N(DC)}$ of MOV 12. By providing a deep cavity 42 and contact element 54 having a spring biasing feature, different MOVs 12 of varying thicknesses may be used in housing 20, thereby enabling the formation of a voltage suppression device 10 having different voltage ratings. Regardless of the thickness of the MOV used, contact element 54 forces the MOV against rail 46, thereby positioning surface 12a of MOV 12 in the same relative position within housing 20.

Figure 5:
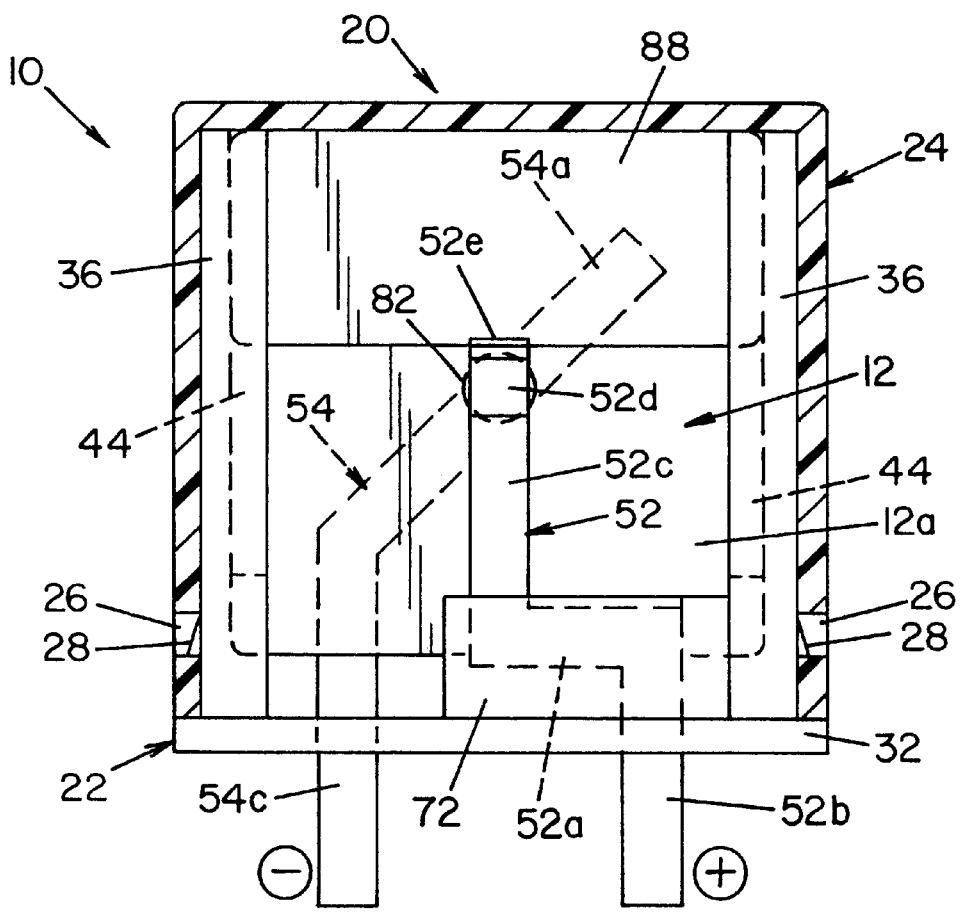
FIG. 5 is a partially sectioned, front elevational view of the circuit protection device shown in FIG. 1.
Figure 6:
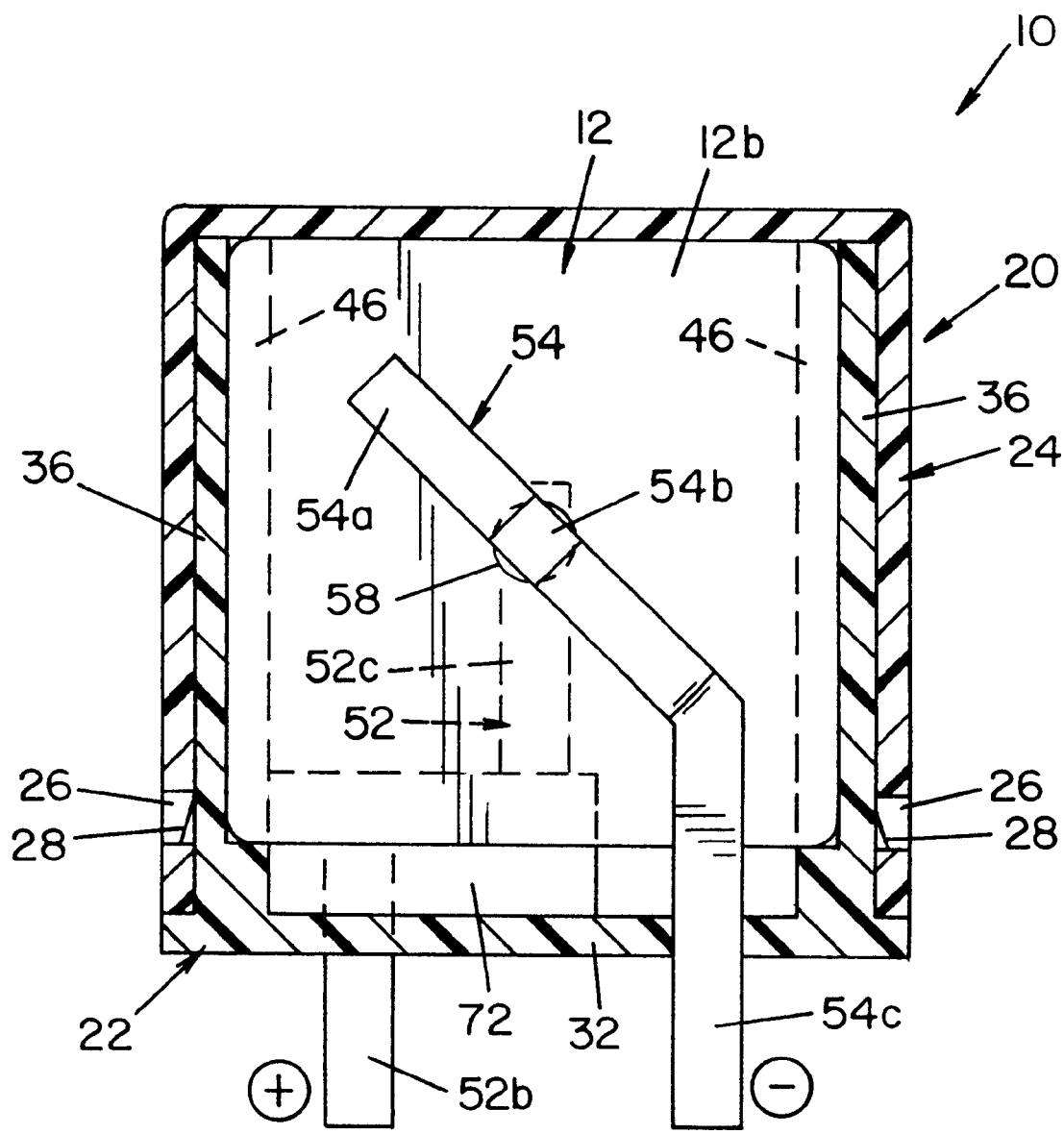
FIG. 6 is a partially sectioned, back elevational view of the circuit protection device shown in FIG. 1.

Referring now to FIGS. 1–3 and 5, contact element 52 is best seen. Contact element 52 is comprised of a short body portion 52a having an elongated leg portion 52b and an elongated arm portion 52c. As best seen in FIG. 5, leg portion 52b and arm portion 52c extend from opposite ends of body portion 52a in opposite directions. As best seen in FIG. 3, the end of arm portion 52c is bent to define a flat elbow portion 52d and a flat finger portion 52e. Arm portion 52d and finger portion 52e define a generally J-shaped configuration at the end of arm portion 52c.

Like contact element 54, contact element 52 is formed of a conductive spring metal. In a normal configuration, body portion 52a, leg portion 52b and arm portion 52c are flat and lie in the same general plane. Elbow portion 52d and finger portion 52e are bent to one side of this plane. Contact element 52 is mounted to base section 22 in a generally rectangular mounting boss 72 that extends from both bottom wall 32 and a side wall 36. Mounting boss 72 includes a slot 74, best seen in FIG. 1, dimensioned to receive body portion 52a. An opening that communicates with slot 74 extends through bottom wall 32. The opening is dimensioned to receive leg portion 52b of contact element 52. Slot 74 is dimensioned such that contact element 52 may be press-fit into mounting boss 72, with a portion of leg portion 52b extending through and beyond bottom wall 32 of base section 22, as seen in FIGS. 2 and 3. Contact element 52 is dimensioned such that arm portion 52c extends from mounting boss 72. In accordance with the present invention, arm portion 52c is forced back toward MOV 12 and is held in position by a solder material 82 that secures planar elbow portion 52d to surface 12a of MOV 12. Unlike high temperature solder 58, solder material 82 is preferably formed of a material that has a relatively low softening temperature or melting temperature. A melting temperature, metal alloy or a polymer having a low softening temperature may be used. Specifically, solder material 82 is preferably a solid at room temperature (25° C.), and is a solid up to temperatures around 35° C. Preferably solder material 82 has a melting temperature or a softening temperature of between about 70° C. and about 140° C., and more preferably, has a melting temperature or a softening temperature of between about 90° C. and about 100° C.

In the embodiment shown, solder material 82 is formed of an electrically conductive material or fusible alloy that has a melting temperature of about 95° C. The exposed surface of the zinc oxide granules of MOV 12 allows the solder material 82 to adhere to the surface of MOV 12. When soldered to MOV 12, arm portion 52c of contact element 52 is in a first position, best seen in FIG. 2. Absent solder material 82, arm portion 52c would move away from MOV 12 to its normal planar configuration aligned with body portion 52a and leg portion 52b. Solder material 82, thus maintains contact element 52 in electrical contact with surface 12a of contact MOV 12. In this respect, contact element 52 is adapted to be a positive lead that is connectable to a power line of a circuit as shall be hereinafter be described.

As best seen in FIG. 2, finger portion 52e of contact element 52 is dimensioned to traverse a plane defined by opposing slots 44 in side walls 36. More specifically, finger portion 52e is dimensioned to support an arc shield 88. Arc shield 88 is a rectangular plate formed of an electrically non-conductive material such as plastic, glass, ceramics or a composition thereof. Arc shield 88 dimensioned to be freely slideable within slots 44. With finger portion 52e of contact element 52 maintained in its first position, arc shield 88 rests upon finger portion 52e and is maintained in a first position at the upper end of slot 44, as best seen in FIG. 2.

Cover portion 24 of housing 20 is generally rectangular in shape and defines a cavity that is dimensioned to enclose base section 22 and the components mounted thereon. Cover section 24 is adapted to be attached to base section 22. Cover section 24 and base section 22 are preferably formed of a molded plastic material and may be joined by ultrasonic welding. In the embodiment shown, apertures 26 are formed in cover section 24 to receive tabs 28 projecting from side walls 36 of base section 22, as seen in FIG. 5. Cover section 24 is secured to base section 22 in snap lock fashion as is conventionally known.

Figure 7:
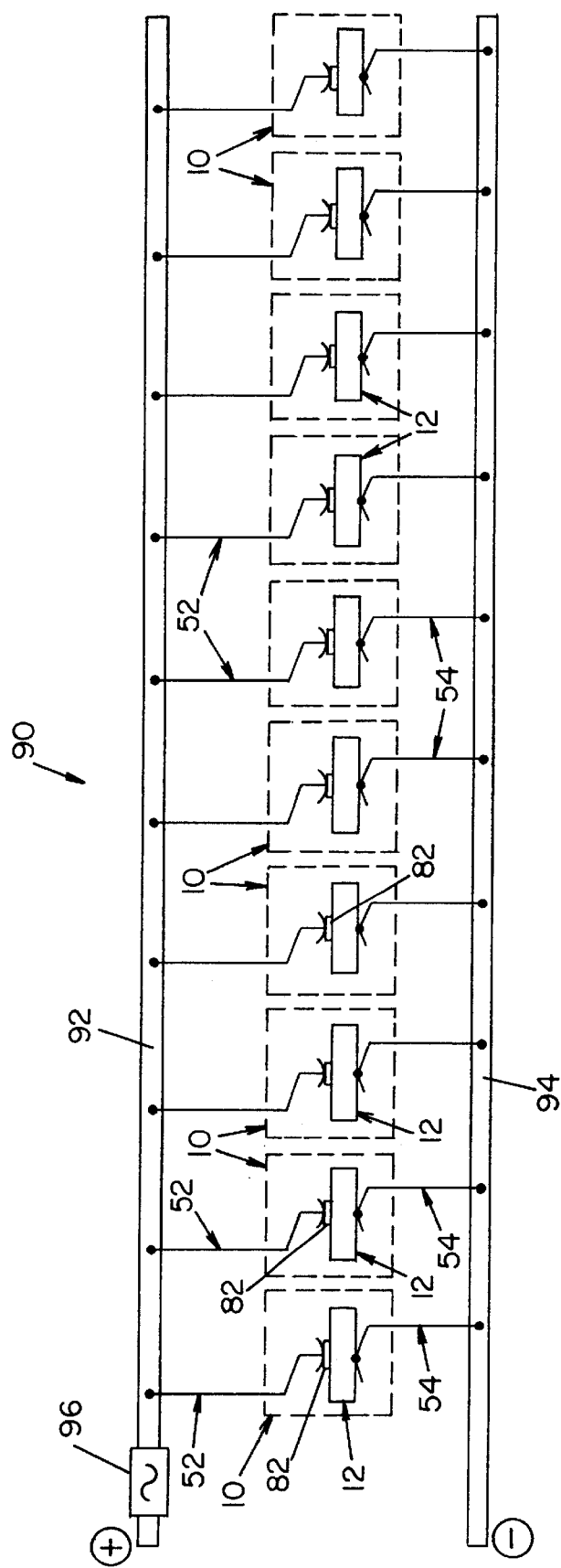
FIG. 7 is a schematic view of a circuit protection array comprised of ten circuit protection devices as shown in FIG. 1.

Referring now to the operation of voltage suppression device 10, one or more voltage suppression devices 10 may be used together to protect a circuit against an over-voltage fault. FIG. 7 schematically shows a voltage suppression system 90 comprised of ten voltage suppression devices 10. Each voltage suppression device 10 in system 90 has the same rated "nominal voltage" $V_{N(DC)}$ and a peak current surge rating. The current surge protection afforded by system 90 is thus ten roughly times the peak current surge rating of a voltage suppression device 10 used in system 90. For example, if each voltage suppression device 10 has a peak current surge rating of 10,000 amps, system 90 has a peak current surge rating of 100,000 amps. As indicated above, although each voltage suppression device 10 may have the same "rated nominal voltage," in actuality, the "rated nominal voltage" of each of the MOVs within a voltage suppression device 10 may vary between a $V_{MIN}$ and a $V_{MAX}$. As a result, the current surge experienced by each voltage suppression device 10 may not occur at the same instant, as shall hereinafter be described.

Each voltage suppression device 10 is connected across a power line designated 92 and a ground or neutral line designated 94. Specifically, contact element 52 of each voltage suppression device 10 is connected to power line 92 and contact element 54 of each voltage suppression device 10 is connected to ground or neutral line 94. In the embodiment of voltage suppression system 90 shown, a fuse element 96 precedes suppression system 90 and power line 92 to prevent an over-current condition in excess of what system 90 can handle from reaching system 90 and the circuit to be protected (not shown). In the system described above, i.e., a system 90 having ten voltage suppression devices 10, each having a peak current surge rating of 10,000 amps, fuse element 96 would have a current rating of about 100,000 amps. When connected as shown in FIG. 7, MOV 12 of each voltage suppression device 10 senses the voltage across power line 92 and ground or neutral line 94.

Absent any over-voltage fault condition, each voltage suppression device 10 has a first state, as depicted in FIG. 2, wherein elbow portion 52d of contact element 52 is in electrical contact with surface 12a of MOV 12 through low temperature solder material 82.

During a fault, an over-current condition or an over-voltage condition may appear. In the event of a high over-current condition that is in excess of the total peak current surge ratings for all devices 10 in system 90, fuse element 96 will open, thereby disconnecting system 90 from the electrical supply and preventing damage to the system components. In the event of an over-voltage condition or repetitive pulse condition, MOVs 12 of voltage suppression devices 10 will experience an overvoltage condition. When this occurs, thermal energy is created by the surge current and each MOV 12 begins absorbing energy and dissipating such energy as heat. As the voltage across an MOV 12 becomes larger, electrical conductivity of the MOV 12 increases and increased amounts of heat are thereby generated. As indicated above, because the actual characteristics of each MOV 12 are not identical, one MOV will have a lower energy rating and a faster thermal response time as contrasted to the others. Thus, various MOVs will heat up more rapidly than other MOVs within voltage suppression system 90. If the fault condition is severe enough, the MOV of one or more voltage suppression devices 10 will heat up to the melting temperature of low temperature solder material 82. When this occurs, arm portion 52c of contact element 52 is no longer held in its first position (as shown in FIG. 2). When solder material 82 melts, arm portion 52c is free to move away from surface 12a of MOV 12, as the spring metal material forming contact element 52 seeks to return to its normal planar configuration. As arm portion 52c moves away from MOV 12, the conductive path through MOV 12 is broken thus effectively taking the related circuit suppression device 10 "off-line." At the same time, arm portion 52c of contact element 52 breaks away from MOV 12, it also moves away from and no longer supports arc shield 88. Without the support or arm portion 52c, arc shield 88 drops down to the bottom of slot 44 under the influence of gravity to a position wherein arc shield 88 is disposed between arm portion 52c and surface 12a of MOV 12. In this position, shield 88 prevents subsequent arcing between arm portion 52c and MOV 12.

When one voltage suppression device 10 drops "off-line," the current surge rating of the entire suppression system 90 is reduced. Using the example set forth above, if one voltage suppression device 10 drops "off-line," system 90 will lose the 10,000 ampere surge capability of the dropped device 10, but would still have a current surge rating of 90,000 amps, until such time as the off-line suppression device 10 is replaced.

The present invention thus provides a voltage suppression device 10 that may be used alone or in conjunction with other similar devices to form a voltage suppression system. Device 10 is a self-contained unit that is operable to suppress voltage spikes in a circuit and drop off-line when the voltage spike significantly exceeds the rated nominal voltage of the device to be protected thereby preventing catastrophic failure of the same.

Figure 8:
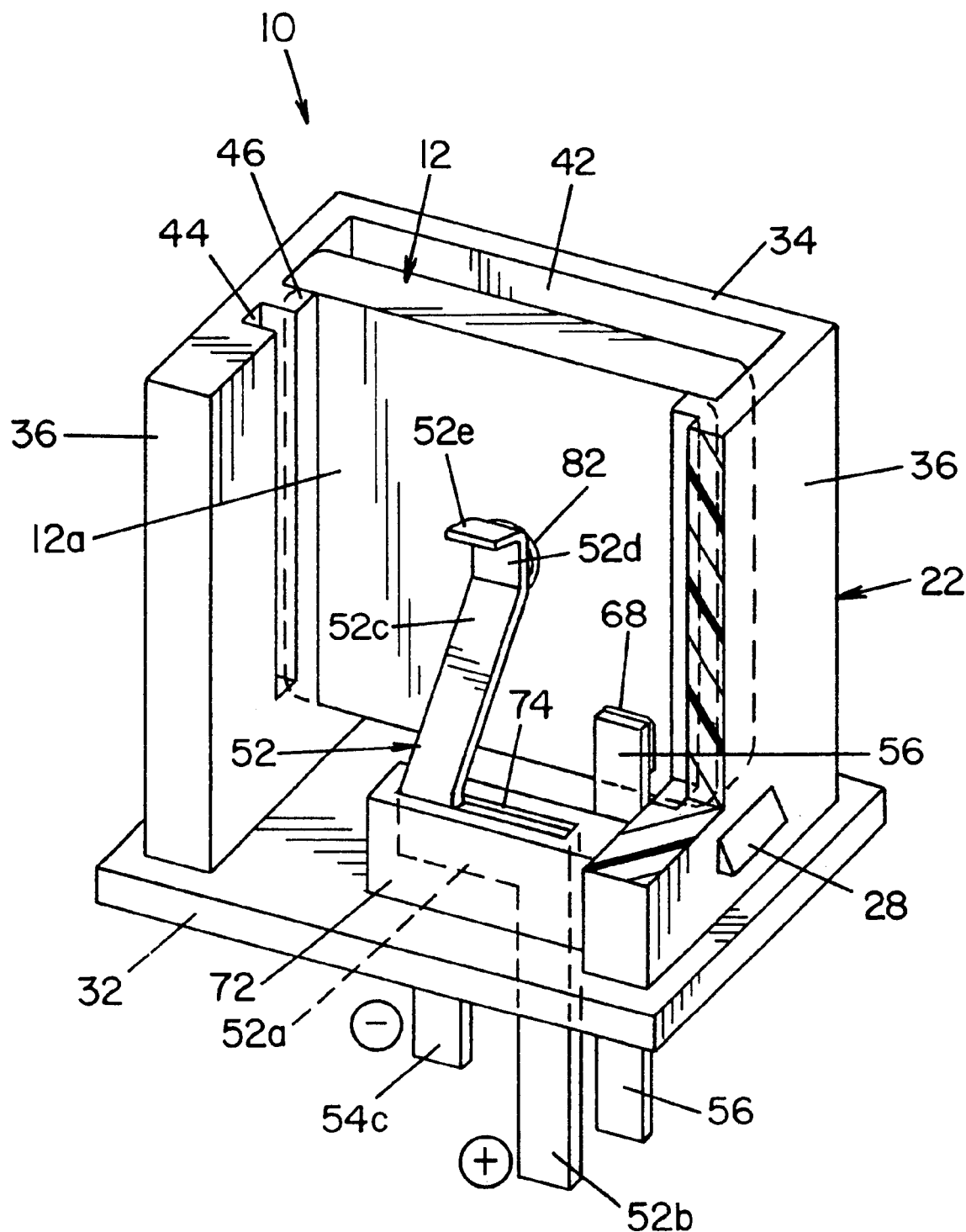
FIG. 8 is a partially sectioned, perspective view of the circuit protection device, illustrating a first alternate embodiment of the present invention.

Referring now to FIG. 8, an alternate embodiment of the present invention is shown. FIG. 8 basically shows a base section 22 having MOV element 12 and contact elements 52 and 54 mounted thereto. The device shown in FIG. 8 is essentially the same as the embodiment previously described with respect to FIGS. 1–6, the difference being that a third contact element designated 56 is provided. Contact element 56 is a straight flat strip of a conductive metal. Contact element 56 is secured to surface 12a of MOV 12 by a high-temperature solder 68 that is similar to the high-temperature conductive material 58 securing contact element 54 to surface 12b of MOV 12. Contact element 56 is dimensioned to extend through an opening (not shown) in bottom wall 32 and to project therebeyond. Contact element 56 provides an indicator lead that is attachable to an indicator device such as a light, alarm or the like, or may be used as a lead attached to a computer terminal to monitor the "state" of voltage suppression device 10. In this respect, so long as elbow portion 52d remains in contact with surface 12a of MOV 12, power sensed by contact 52 is connected to contact element 56 along the conductive surface 12a of MOV 12. In the event of an over-voltage condition wherein elbow portion 52d of contact element 52 disconnects from surface 12a of MOV 12, current to contact element 56 ceases. This change of state from a conductive state to a non-conductive state may be used to provide an indication of when voltage suppression device 10 has been tripped.

Figure 9:
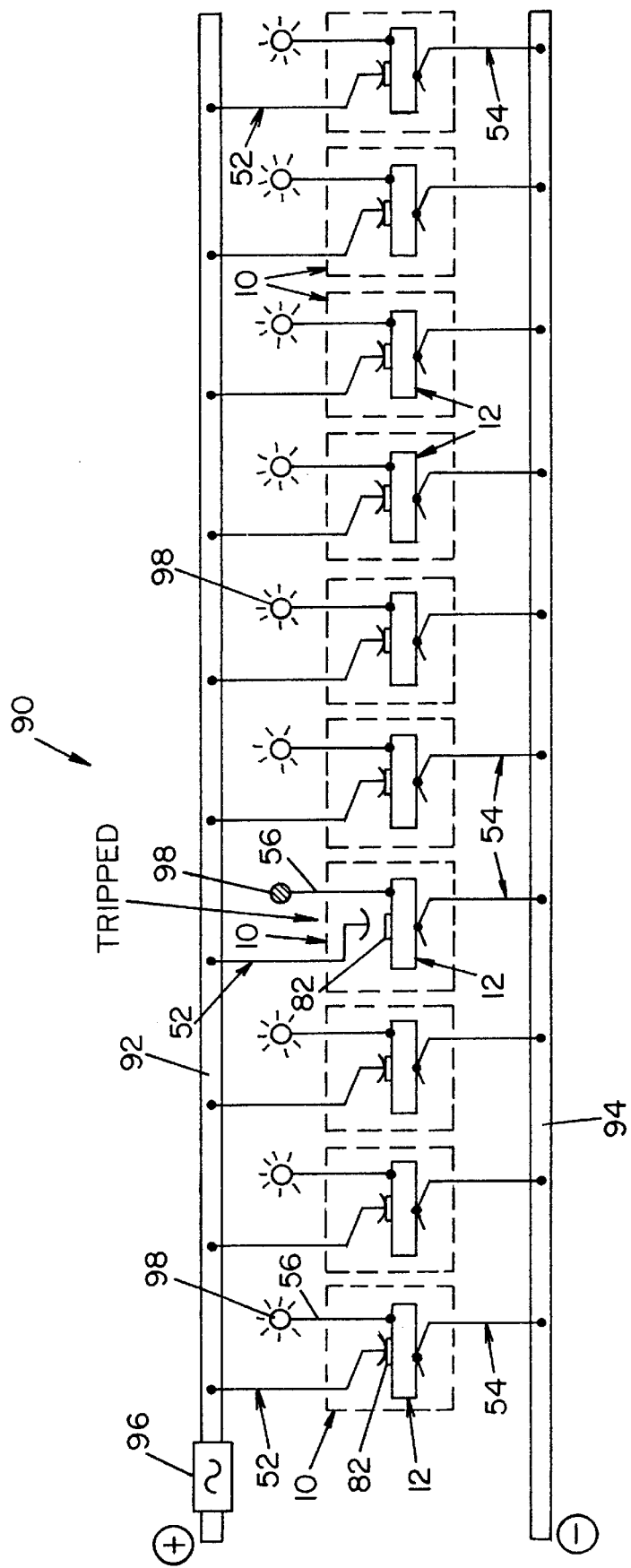
FIG. 9 is a schematic view of a circuit protection array comprised of ten circuit protection devices as shown in FIG. 8.

In this respect, FIG. 9 shows voltage suppression system 90, as previously shown in FIG. 7, including contact element 56 connected to an indicator, designated 98. By way of example, the fourth voltage sensitive suppression device 10 from the left is shown "tripped" (i.e. elbow portion 52d has moved away from surface 12a) an indicator 98 is shown as non-illuminated. As indicated above, contact element 56 may be connected to a remote monitoring system that is operable to detect the change in electrical condition of contact element 56 and thereby provide an indication of the voltage suppression devices 10 in array 90 has "tripped" and needs replacement.

The embodiments shown heretofore are adapted for use in a specific orientation. In this respect, arc shield 88 is operable under gravity to move to an insulating position between arm portion 52c and surface 12a of MOV 12. It will of course be appreciated that some applications may require positioning of a voltage suppression device 10 in other than an upright position.

FIGS. 10–15 show a transient suppression voltage device 100, illustrating an alternate embodiment of the present invention that is operable in any orientation and that includes means for providing visual and electronic indications of a "tripped" device.

Figure 10:
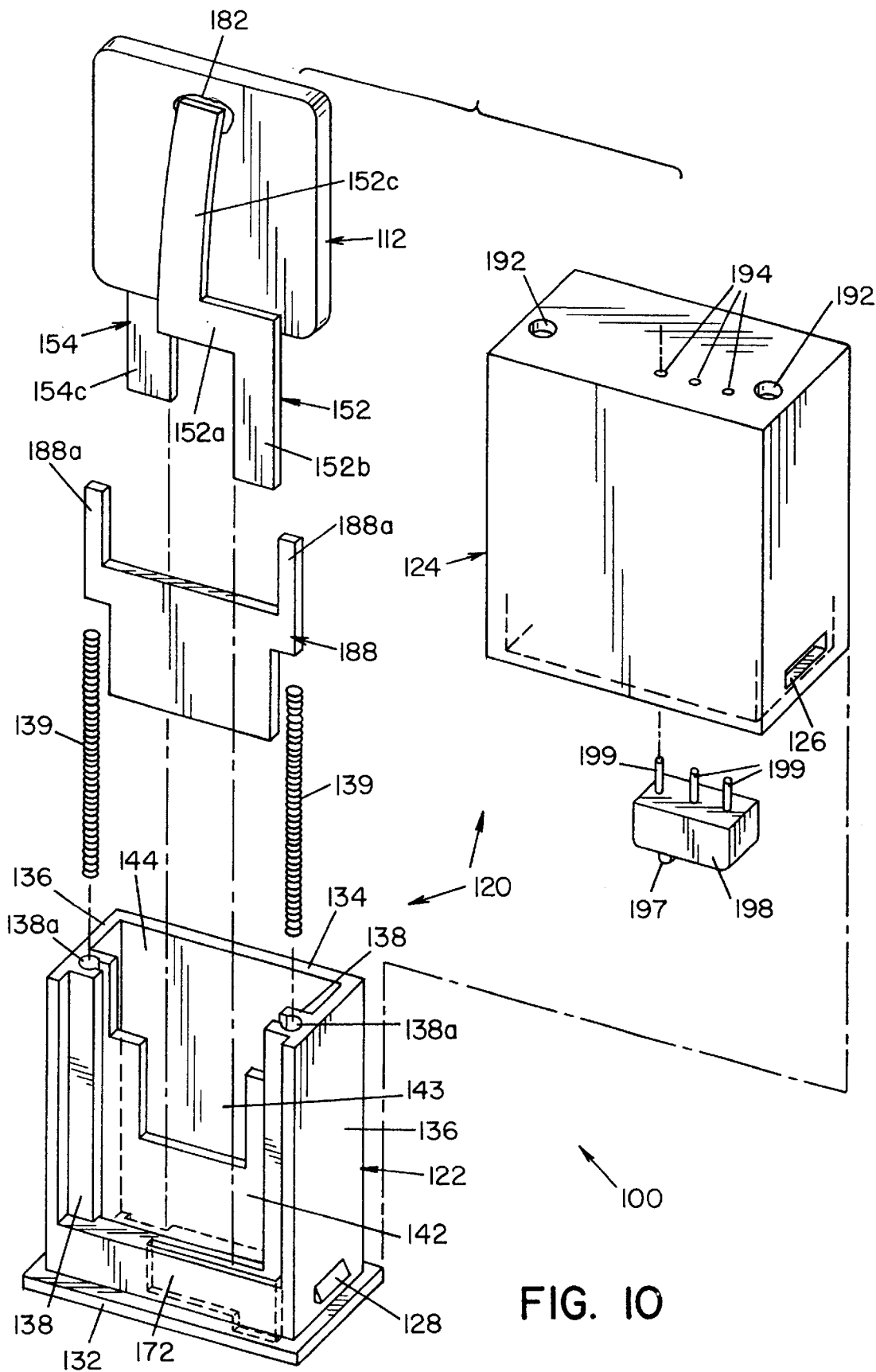
FIG. 10 is an exploded, pictorial view of a circuit protection device illustrating a second alternate embodiment of the present invention.
Figure 12:
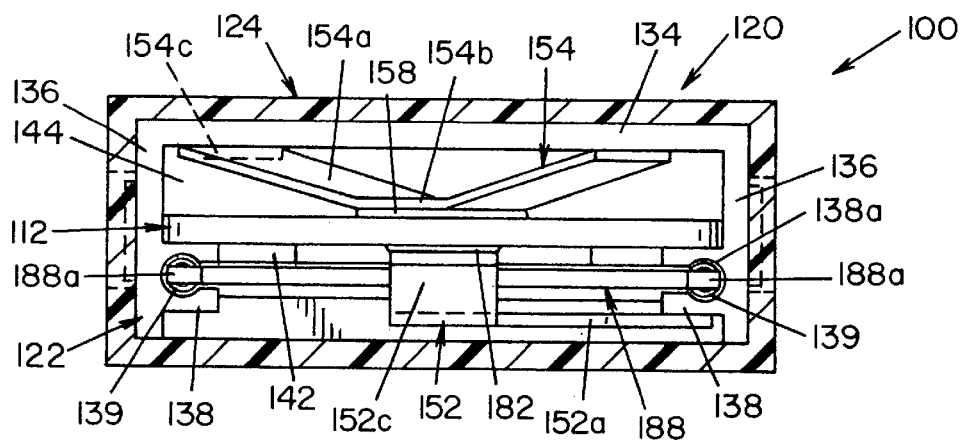
FIG. 12 is a cross-sectional, plan view of the circuit protection device shown in FIG. 10.

Voltage suppression device 100 is generally comprised of a voltage sensitive element 112 that is contained within housing 120. Housing 120 is comprised of a base section 122 and a cover section 124. Base section 122 is adapted to receive and hold the operative elements of voltage suppression device 100. To this end, base section 122 includes a planar bottom wall portion 132 and a generally U-shaped structure comprised of a back wall 134 and opposed sidewalls 136 that extend from bottom wall 132. A slotted rail 138 is formed along the inner surface of each sidewall 136. Rails 138 are disposed in alignment with each other and extend generally perpendicularly from bottom wall 132. A cylindrical cavity, designated 138a, is defined at the bottom of the slot in slotted rails 138. Cavity 138a is dimensioned to receive a compression spring 139, as best seen in FIG. 10. A short wall section 142 extends between sidewalls 136. Wall section 142 is disposed to one side of the slot in slotted rails 138, and includes a centrally located, rectangular notched area 143. A cavity 144 is defined between short wall 142 and back wall 134. Cavity 144 (see FIG. 12) is dimensioned to receive voltage sensitive element 112. Voltage sensitive element 112 is a metal oxide varistor (MOV) of the type heretofore described in the prior embodiment. Voltage sensitive element 112 is preferably rectangular in shape to fit within cavity 144, but may also be cylindrical in shape in which case the bottom portion of cavity 144 would be semi-cylindrical to receive the cylindrical MOV.

A pair of electrical contact elements 152, 154 are provided for electrical attachment to the opposite sides of MOV 112. Contact element 154, best seen in FIGS. 12 and 13, includes a generally V-shaped body, designated 154a, having a generally flat mid-section 154b and a flat elongated leg portion 154c (see FIG. 13). Contact element 154 is dimensioned such that mid-section 154b is attached to the surface of MOV 112 by an electrically conducting material, designated 158 in the drawings. Conductive material 158 is preferably formed of a high temperature metallic solder such as silver, lead or alloys thereof. Mid-section 154b is attached to the surface of MOV 112 such that leg portion 154c extends through an opening in bottom wall portion 132 of base section 122. The projecting portion of leg portion 154c is provided as a negative lead for attachment to a ground or neutral line of an electrical circuit. As discussed in the previous embodiment, contact element 154 is preferably formed of a spring metal to act as a spring to force MOV 112 away from back wall 134 and into contact against slotted rails 138.

Figure 11:
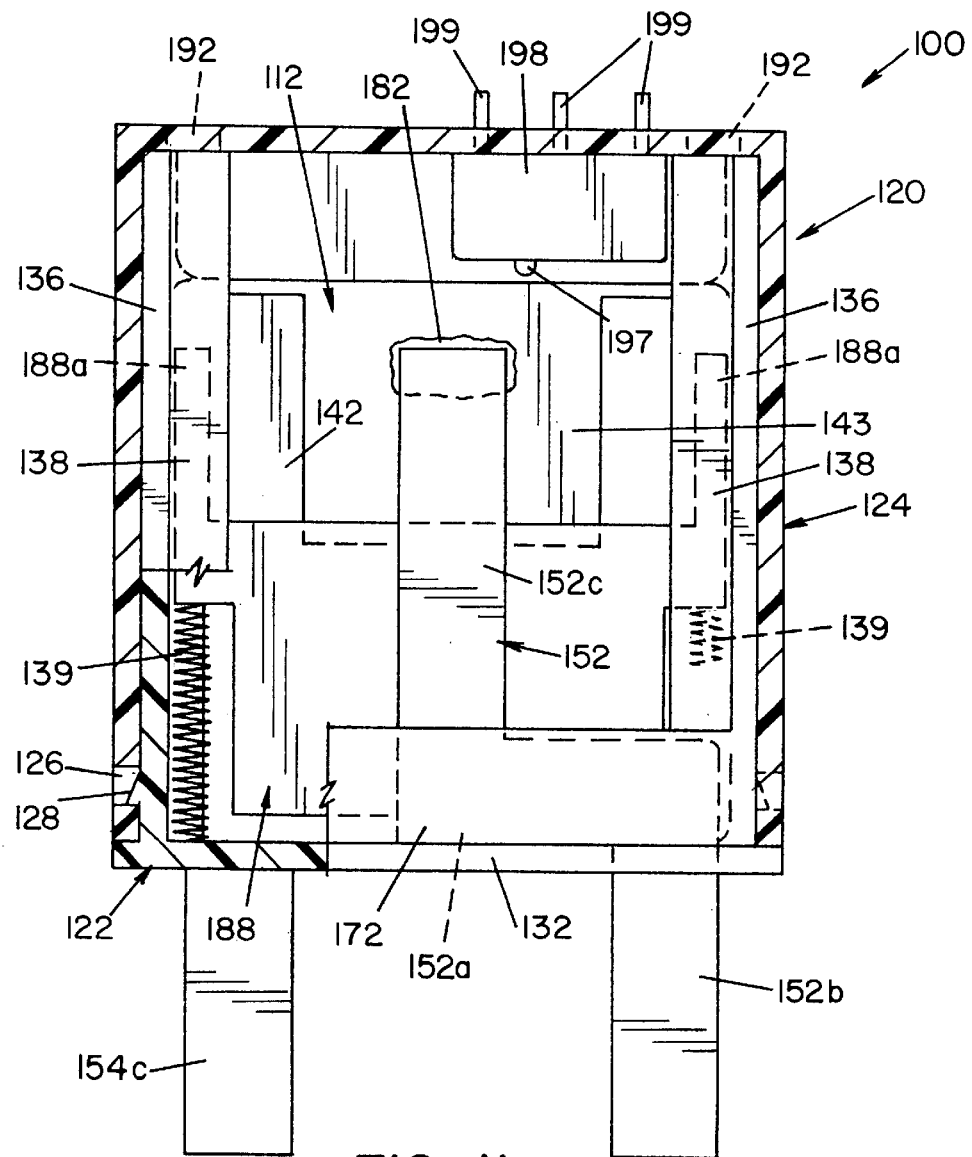
FIG. 11 is a cross-sectional, front view of the circuit protection device shown in FIG. 10.

As best seen in FIG. 11, contact element 152 is comprised of a short body portion 152a having an elongated leg portion 152b and an elongated arm portion 152c. Leg portion 152b and arm portion 152c extend from opposite ends of body portion 152a in opposite directions. Like contact element 154, contact element 152 is preferably formed of conductive spring metal. In a normal configuration, body portion 152a, leg portion 152b and arm portion 152c are flat and lie in the same general plane. Contact element 152 is mounted to base section 122 in a generally rectangular mounting boss 172 that extends from bottom wall 132 between side walls 136. Mounting boss 172 includes a slot dimensioned to receive body portion 152 and an opening through bottom wall 132 that communicates with the slot. An opening is dimensioned to receive leg portion 152b of contact element 152. The slot and the opening in mounting boss 172 are dimensioned such that contact element 152 may be press-fit into mounting boss 172 with a portion of leg portion 152b extending through and beyond bottom wall portion 132.

Figure 13:
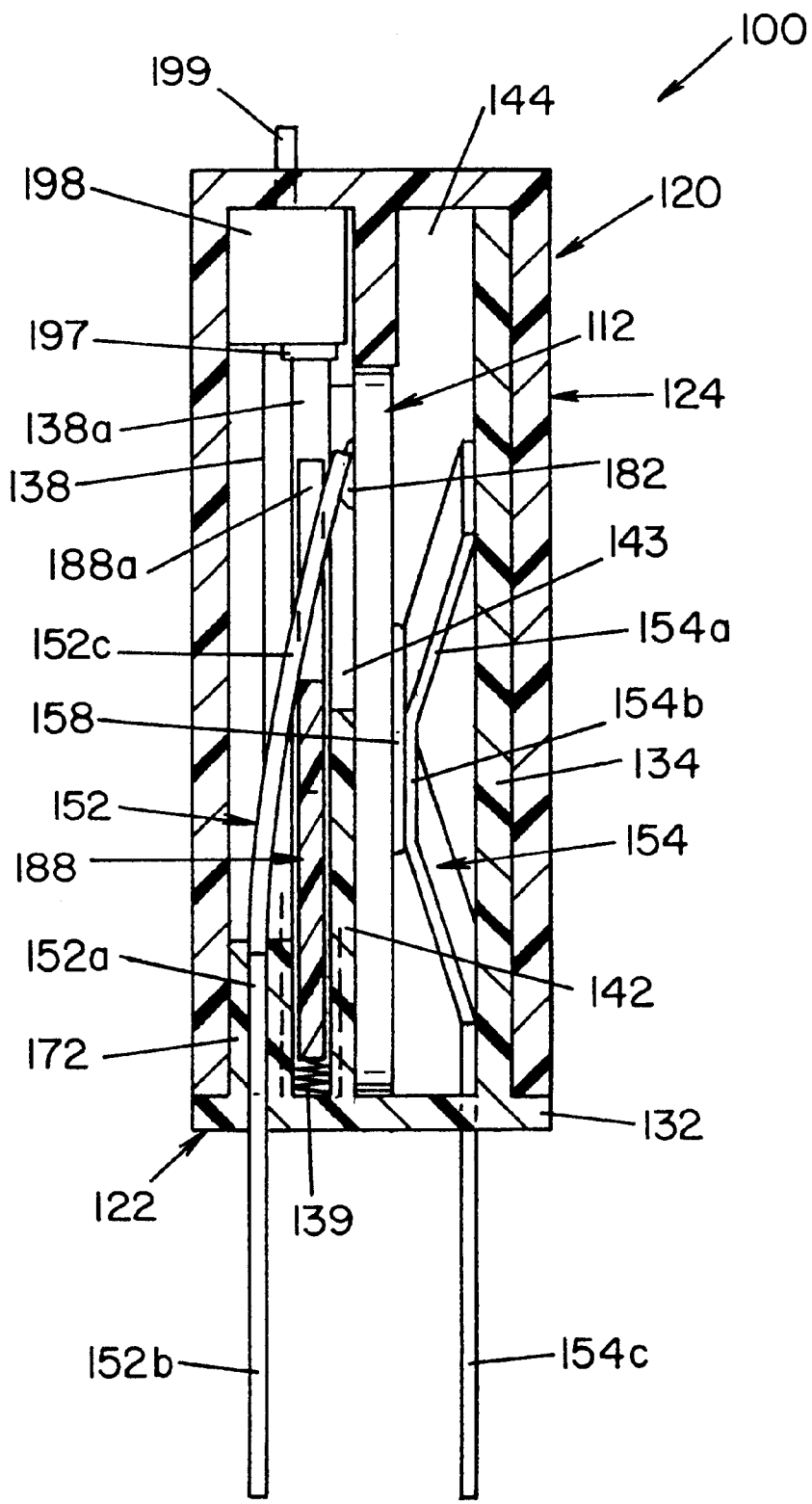
FIG. 13 is a cross-sectional, side view of the circuit protection device shown in FIG. 10.

As best illustrated in FIG. 13, contact element 152 is dimensioned such that arm portion 152c extends upward from mounting boss 172. Arm portion 152c is adapted to be bent backward toward MOV 112 and to be held against the surface of MOV 112 by a solder material 182, as best seen in FIG. 13. Arm portion 152c is held in electrical contact with the surface of MOV 112 by a solder material 182 of the type heretofore described in the prior embodiment, i.e., a material that has a relatively low softening temperature.

An arc shield 188 is provided between contact element 152 and MOV 112, as best seen in FIG. 13. Arc shield 188 is basically a flat plate dimensioned to be freely slideable within the slot defined by slotted rail 138. Arc shield 188 includes a pair of elongated arms, designated 188a, that extend upward from the upper edge thereof. The lower ends of arms 188a are dimensioned to abut compression springs 139, as best seen in FIG. 14. Arc shield 188 has a first position, shown in FIG. 13, wherein arc shield 188 is held near bottom wall portion 132 against the biasing force of compressed springs 139 by contact element 152. Arc shield 188 is formed of an electrically non-conductive material such as plastic, glass, ceramic or a composition thereof.

As best seen in FIG. 10, a plurality of apertures 192, 194 are formed in the upper surface of cover 124. Apertures 192 are larger than apertures 194 and are disposed on cover 124 to be in alignment with arm portions 188a of arc shield 188. Apertures 192 are dimensioned to allow arm portions 188a to project therethrough. Apertures 194 are dimensioned to receive leads from an electrical switch 198 that is disposed within voltage suppression device 100. Switch 198 includes an actuator pin 197 and electrical leads 199. Switch 198 is disposed within cover 124 such that actuating pin 197 is aligned in the plane of arc shield 188. Leads 199 on switch 198 extend through openings 194 and cover 124 for attachment to an external circuit.

As best seen in FIG. 10, a plurality of apertures 192, 194 are formed in the upper surface of cover 124. Apertures 192 are larger than apertures 194 and are disposed on cover 124 to be in alignment with arm portions 188a of arc shield 188. Apertures 194 are dimensioned to allow arm portions 188a to project therethrough. Apertures 194 are dimensioned to receive leads from an electrical switch 198 that is disposed within voltage suppression device 100. Switch 198 includes an actuator pin 197 and electrical leads 199. Switch 198 is disposed within cover 124 such that actuating pin 197 is aligned in the plane of arc shield 188. Leads 199 on switch 198 extend through openings 194 and cover 124 for attachment to an external circuit.

Figure 16:
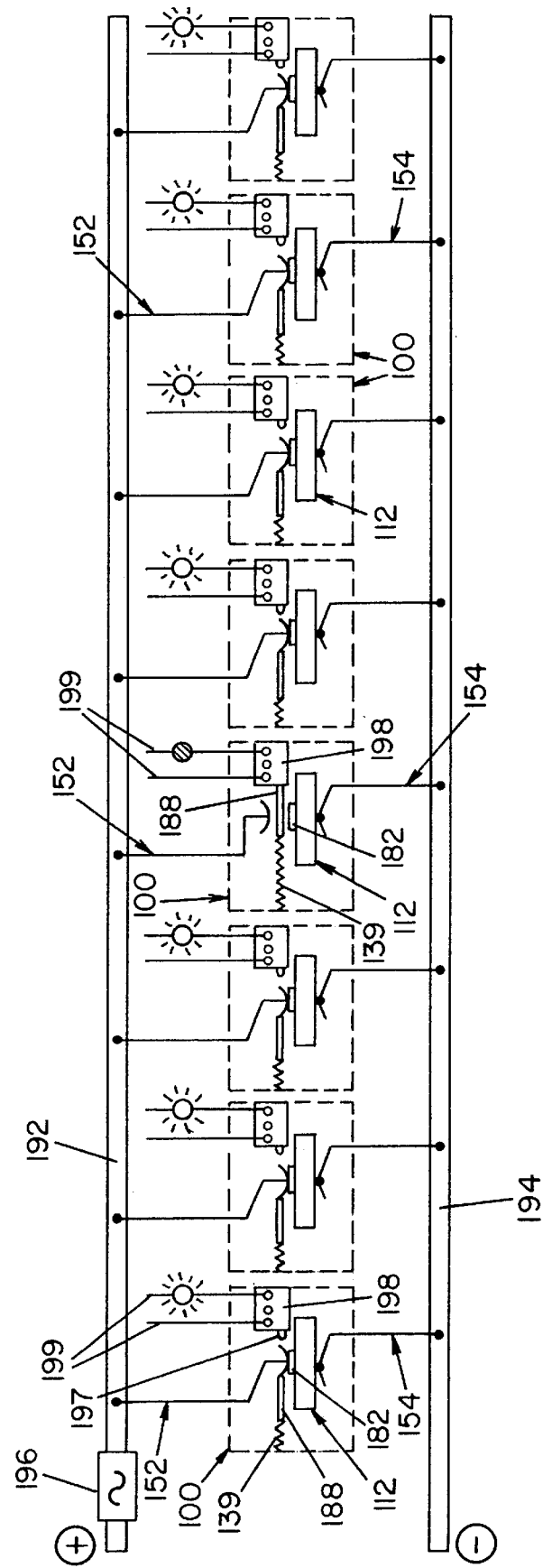
FIG. 16 is a schematic view of a circuit protection array comprised of ten circuit protection devices as shown in FIG. 10.

Referring now to the operation of voltage suppression device 100, one or more of such devices may be used together to protect the circuit against an over-voltage fault. In this respect, over-voltage device 100 may be part of a voltage suppression system as schematically illustrated in FIG. 16. When connected as shown in FIG. 16, MOV 112 of each voltage suppression device 100 in the array senses the voltage across power line 192 and ground or neutral line 194. Absent an over-voltage fault condition, each suppression device 100 has a first state as depicted in FIG. 13, wherein arm portion 152c of contact element 152 is in electrical contact with the surface of MOV 112 through low temperature solder 182. In this position, contact element 152 maintains arc shield 188 in its first position as shown in FIG. 13. As in the previous embodiment, during a fault, an over-current condition or over-voltage condition may appear. In the event of a high over-current condition, a fuse element 196 will sense the fault and open, thereby disconnecting the system from the electrical supply and preventing damage to the system. In the event of an over-voltage condition or repetitive pulse condition, MOV 112 of each voltage suppression device 100 will experience the over-voltage condition. As indicated with the previous embodiment, if the fault condition is severe enough, MOV 112 in one or more of the voltage suppression devices 100 will heat up to the melting temperature of low soldering temperature 182. When this occurs, arm portion 152c of contact element 152 will be released from the surface of MOV 112 as solder material 182 melts or softens. Arm portion 152c is then free to move away from surface of MOV 112, as the natural spring of metal forming element 152 seeks to return it to its normal, planar configuration. As arm portion 152c moves away from MOV 112, the conductive path through MOV 112 is broken, thus effectively taking the related circuit suppression device 100 "off-line." At the same time arm portion 152c of contact element 152 breaks away from MOV 112, it is also separated from MOV 112 by arc shield 188. In this respect, because arc shield 188 is no longer constrained to its first position by arm 152c, it moves upward thereby forming a barrier between contact element 152 and MOV 112. As arc shield 188 moves upward under the influence of biasing springs 139, arm portions 188a project through openings 194 in cover 124, thereby providing a visual indication that device 100 has been triggered, as illustrated in FIGS. 14 and 15. In addition, the upper edge of arc shield 188 contacts switch-actuating pin 197 of switch 198 thereby actuating switch 198. Switch 198 may control a local indicator (not shown) to provide an indication of the condition of voltage suppression device 100, or provide a signal to a remote location to provide an indication of the condition of voltage suppression device 100.

Voltage suppression device 100 thus provides a self contained unit that is operable to suppress voltage spikes in the circuit, and to drop off-line when the voltage is significantly higher than the rated voltage of the device thereby preventing catastrophic failure of voltage suppression device 100. Voltage suppression device 100 is operable in any orientation and provides both a visual indication of the condition of voltage suppression device 100, as well as an electrical signal to an external circuit or device that is indicative of the condition of device 100.

Figure 17:
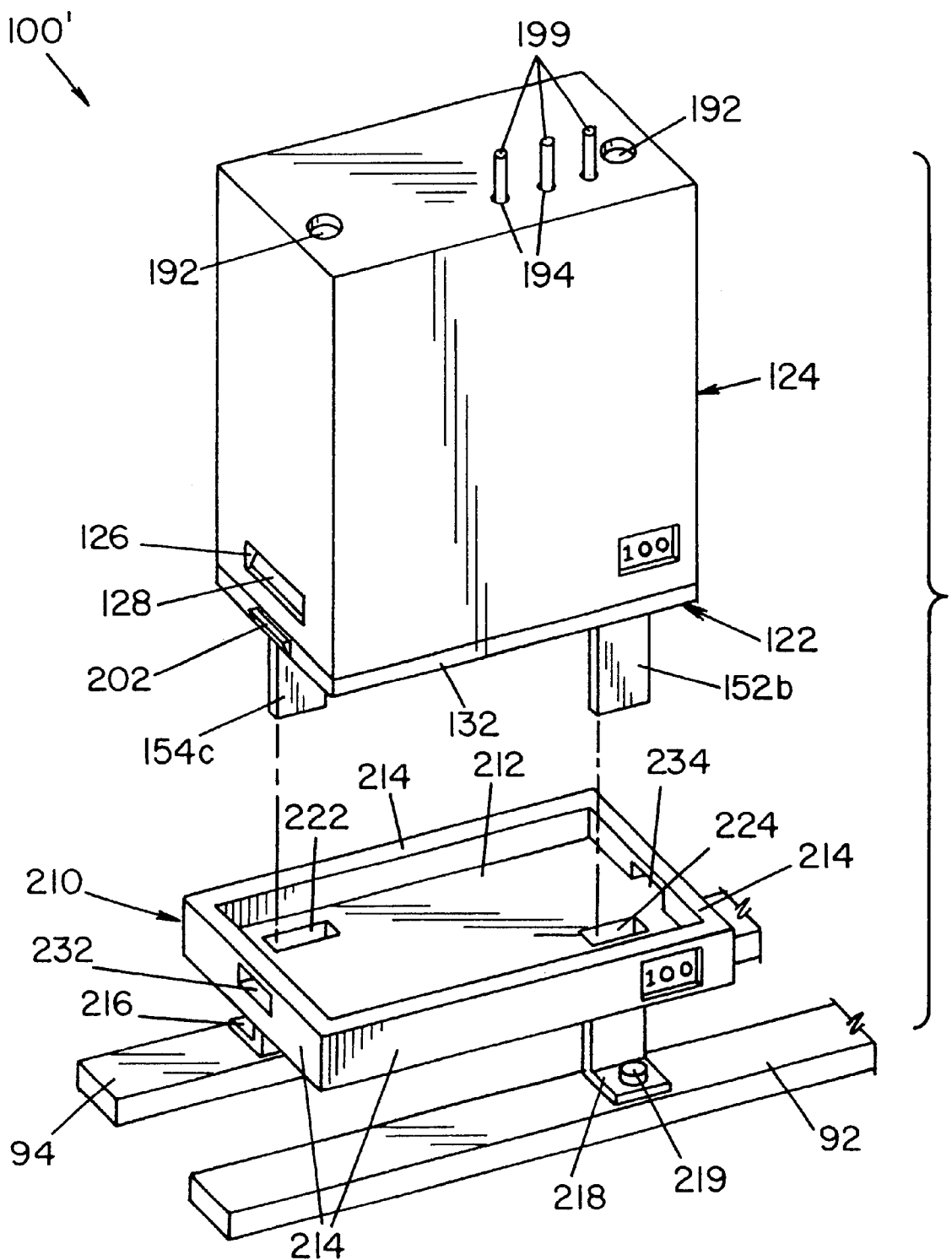
FIG. 17 is a perspective view of a circuit protection device and base assembly, illustrating another embodiment of the present invention.

Referring now to FIG. 17, a modification to voltage suppression device 100 is shown. In FIG. 17, a voltage suppression device, designated 100', illustrates an alternate embodiment of the present invention. Voltage suppression device 100' is similar in all respects to voltage suppression device 100 as heretofore described, with the exception that voltage suppression device 100' includes tabs 202 that extend outwardly from base section 122 (only one tab 202 is shown in FIG. 17). In FIG. 17, like components to those previously described bear like reference numbers.

Tabs 202 are provided to allow voltage suppression device 100' to be locked into a base 210. Base 210 is generally rectangular in shape, and includes a flat bottom wall 212 and short side walls 214. A first conductive leg 216 extends from base 210 and is attached to ground or neutral line 94. A second conductive leg 218 extends from bottom wall 212 and is electrically connected to power line 92. In the embodiment shown, legs 216, 218 are generally L-shaped and attached to ground or neutral line 94 and power line 92 by fasteners 219. Base section 210 includes a first pair of spaced apart openings 222, 224 that extend through bottom wall 212 adjacent conductive legs 216, 218. Openings 222, 224 are dimensioned to receive contact leg portions 154c, 152b of voltage suppression device 100'. Openings 222, 224 allow contact legs 154c, 152b to come into electrical contact with conductive leg portions 216, 218, and to be electrically connected to ground or neutral line 94 and power line 92, respectively. A second pair of openings 226, 228 is formed in opposed side walls 214. Openings 226, 228 are adapted to receive tabs 202 on voltage suppression device 100' to allow voltage suppression device 100' to be snapped into base 210. As indicated above, when voltage suppression device 100' is attached to base 210, contact legs 152b, 154c are in electrical contact with power line 92 and ground or neutral line 94, respectively.

Base 210 is provided for permanent attachment to power line 92 and ground or neutral line 94. Voltage suppression device 100' is thus replaceable in the event that voltage suppression device 100' exceeds its voltage rating and opens the circuit. When voltage suppression device 100' has "tripped," it may easily replaced by removing it from base 210 and replacing it with another voltage suppression device 100' of like rating. In this respect, in accordance with another aspect of the present invention, there is preferably provided indication means for insuring that a voltage suppression device 100' of a particular size when removed from base 210 is replaced with another voltage suppression device 100' of the same size and voltage rating. Preferably, some type of indication means is provided on both voltage suppression device 100' and base 210 to insure a proper matching of voltage suppression device 100' to base 210. In FIG. 17, like reference numbers, i.e., "100," are provided on both the voltage suppression system and voltage suppression device 100'.

The embodiment shown in FIG. 17 thus provides a simple, quick and convenient method of replacing a voltage suppression device once it has triggered.

The foregoing describes preferred embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A disposable voltage suppression device for suppressing voltage surges in an electrical circuit, said device comprised of:
    a voltage sensitive element having a first surface and a second surface and a predetermined voltage rating across said first and second surfaces, said voltage sensitive element increasing in temperature as voltage applied across said first and second surfaces exceeds said voltage rating;
    a first terminal having one end electrically connected to said first surface of said voltage sensitive element and another end connectable to a ground or neutral line of an electrical circuit;
    a thermal element electrically connected to said second surface of said voltage sensitive element, said thermal element being an electrically conductive solid at room temperature and having a predetermined softening temperature;
    a second terminal having one end in electrical connection with said second surface of said voltage sensitive element and another end connectable to an electrical power line of an electrical circuit, said voltage sensitive element sensing the voltage drop between said electrical power line and ground or neutral line, said second terminal being maintained in electrical contact with said voltage sensitive element by said thermal element and being biased away therefrom, wherein said second terminal moves away from electrical contact with said voltage sensitive element and breaks said electrical current path if an over-voltage condition sensed by said voltage sensitive element exceeds the voltage rating of said voltage sensitive element and causes said voltage sensitive element to heat said thermal element beyond its softening point;
    an arc shield movable from a first position wherein said arc shield allows contact between said second terminal and said voltage sensitive element to a second position wherein said shield is disposed between said second terminal and said voltage sensitive element when said second terminal moves from electrical contact with said voltage sensitive element; and
    a housing enclosing said voltage sensitive element, said one ends of said first and second terminals, said thermal element and said arc shield.

2. A voltage suppression device as defined in claim 1, wherein said voltage sensitive element is a metal oxide varistor (MOV).

3. A voltage suppression device as defined in claim 2, wherein said metal oxide varistor (MOV) is rectangular in shape.

4. A voltage suppression device as defined in claim 1, wherein said thermal element is a metal solder comprised of a fusible alloy.

5. A voltage suppression device as defined in claim 4, wherein said metal solder has a melting point of about 95° C.

6. A voltage suppression device as defined in claim 1, wherein said thermal element is an electrically conductive polymer.

7. A voltage suppression device as defined in claim 1, wherein said arc shield is supported in said first position by said second terminal.

8. A voltage suppression device as defined in claim 1, further comprising a third terminal having one end in electrical connection with said second surface of said voltage sensitive element and another end connectable to an indicator device for indicating whether said second terminal is in electrical connection with said thermal element.

9. A voltage suppression device as defined in claim 8, wherein said indicator device is a light emitting device.

10. A voltage suppression device as defined in claim 8, wherein said indicator device is mounted to said housing.

11. A voltage suppression device as defined in claim 1, wherein said arc shield is biased toward said second position.

12. A voltage suppression device as defined in claim 11, wherein said arc shield is biased by gravity.

13. A voltage suppression device as defined in claim 11, wherein said arc shield is biased by a spring element.

14. A voltage suppression device as defined in claim 13, wherein said arc shield is maintained in said first position by said second terminal when said second terminal is in contact with said thermal element.

15. A voltage suppression device as defined in claim 1, further comprising indication means for indicating the condition of said voltage suppression device.

16. A voltage suppression device as defined in claim 15, wherein said indication means is an electrical switch.

17. A voltage suppression device as defined in claim 15, wherein said indication means is a mechanical indicator.

18. A voltage suppression device for suppressing voltage surges in an electrical circuit, said device comprised of:
    a voltage sensitive element having a predetermined voltage rating, said voltage sensitive element increasing in temperature as voltage applied across said voltage sensitive element exceeds said voltage rating;
    terminals for electrically connecting said voltage sensitive element between a power line of an electrical circuit and a ground or neutral line of said electrical circuit;
    a normally closed, thermal switch comprised of one end of one of said terminals, a surface of said voltage sensitive element and a thermal element, said one end of one of said terminals being maintained in electrical contact with said surface of said voltage sensitive element by said thermal element, said thermal switch being electrically connected in series with said voltage sensitive element between said power line and said voltage sensitive element, said thermal switch being thermally coupled to said voltage sensitive element wherein said one of said terminals moves from a normally closed position wherein said one of said terminals is maintained in electrical contact with said surface of said voltage sensitive element to an open position wherein said one of said terminals moves out of electrical contact with said surface of said voltage sensitive element to form a gap between said one of said terminals and said voltage sensitive element when the temperature of said voltage sensitive element reaches a level causing said thermal element to melt;

a non-conductive barrier operable to move into said gap when said one of said terminals moves to an open position, said barrier preventing line voltage surges from arcing between said one of said terminals and said voltage sensitive element.

19. A voltage suppression device as defined in claim 18, wherein said voltage sensitive element is a metal oxide varistor (MOV).

20. A voltage suppression device as defined in claim 18, further comprising an indicator device for indicating the condition of said voltage suppression device.

21. A voltage suppression device as defined in claim 20, wherein said indicator device is actuated by movement of said barrier.

22. A voltage suppression device as defined in claim 21, wherein said indicator device is an electrical switch.

23. A voltage suppression device as defined in claim 21, wherein said indicator device is a mechanical device.

24. A voltage suppression device as defined in claim 18, wherein said thermal switch is comprised of a contact element held in electrical contact with said voltage sensitive element by a thermal element, said contact element being biased away from said voltage sensitive element.

25. A voltage suppression device as defined in claim 24, wherein said thermal element is a low melting temperature solder material.

26. A voltage suppression device as defined in claim 18, further comprising a detachable base section attachable to said ground or neutral line and said power line of said electrical circuit, said voltage suppression device being received by said base section with said terminals connecting said voltage sensitive element between said power line of said electrical circuit and said ground or neutral line of said electrical circuit.

27. A voltage suppression device as defined in claim 26, wherein said voltage suppression device is received by said base section in snap-lock fashion.

28. A voltage suppression device as defined in claim 26, wherein said voltage suppression device and said base section include matching identification markings.

29. A voltage suppression device for suppressing voltage surges in an electrical circuit, said device comprised of:

a voltage sensitive element having a first surface and a second surface and a predetermined voltage rating across said first and second surfaces, said voltage sensitive element increasing in temperature as voltage applied across said first and second surfaces exceeds said voltage rating;

a first terminal having one end electrically connected to said first surface of said voltage sensitive element and another end connectable to a ground or neutral line of an electrical circuit;

a thermal element electrically connected to said second surface of said voltage sensitive element, said thermal element being an electrically conductive solid at room temperature and having a predetermined softening temperature;

a second terminal formed of a spring metal having one end in electrical connection with said second surface of said voltage sensitive element and another end connectable to an electrical power line of an electrical circuit, said voltage sensitive element sensing the voltage drop between said electrical power line and ground or neutral line, said second terminal being bent from a normal and relaxed configuration maintained in contact with said voltage sensitive element by said thermal element, said second terminal being inherently biased away from said voltage sensitive element toward said normal and relaxed configuration, wherein said second terminal springs away from electrical contact with said voltage sensitive element and breaks said electrical current path if an over-voltage condition sensed by said voltage sensitive element exceeds the voltage rating of said voltage sensitive element and causes said voltage sensitive element to heat said thermal element beyond its softening point;

an arc shield movable from a first position wherein said arc shield allows contact between said second terminal and said voltage sensitive element to a second position wherein said shield is disposed between said second terminal and said voltage sensitive element when said second terminal moves from electrical contact with said voltage sensitive element; and a housing enclosing said voltage sensitive element, said one ends of said first and second terminals, said thermal element and said arc shield.

30. A voltage suppression device as defined in claim 29, wherein said arc shield includes an indicator portion that provides a visual indication external to said housing of movement of said arc shield.

* * * * *